United States Patent
Bernstein et al.

(10) Patent No.: US 9,264,150 B2
(45) Date of Patent: Feb. 16, 2016

(54) REACTIVE METAL OPTICAL SECURITY DEVICE AND METHODS OF FABRICATION AND USE

(75) Inventors: Kerry Bernstein, Underhill, VT (US); Kenneth J. Goodnow, Essex Junction, VT (US); Clarence R. Ogilvie, Huntington, VT (US); Charles S. Woodruff, Charlotte, VT (US); Sebastian T. Ventrone, South Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 995 days.

(21) Appl. No.: 13/432,414

(22) Filed: Mar. 28, 2012

(65) Prior Publication Data
US 2013/0259488 A1    Oct. 3, 2013

(51) Int. Cl.
*H04B 10/85* (2013.01)
*G02B 26/08* (2006.01)

(52) U.S. Cl.
CPC ............ *H04B 10/85* (2013.01); *G02B 26/0816* (2013.01)

(58) Field of Classification Search
CPC ........................... H04B 10/0705; H04B 10/85
USPC ................................................. 359/265–275
See application file for complete search history.

(56) References Cited

U.S. PATENT DOCUMENTS

| | | | |
|---|---|---|---|
| 5,175,840 A | 12/1992 | Sawase et al. | |
| 5,226,103 A | 7/1993 | Guiraud | |
| 5,510,701 A | 4/1996 | Samela et al. | |
| 6,013,318 A | 1/2000 | Hunt et al. | |
| 6,287,985 B1 | 9/2001 | Heffner et al. | |
| 6,319,740 B1 | 11/2001 | Heffner et al. | |
| 7,454,629 B2 | 11/2008 | Timmermans et al. | |
| 7,535,373 B2 | 5/2009 | Dalzell | |
| 2004/0223243 A1* | 11/2004 | Theuss | 359/883 |
| 2005/0248824 A1* | 11/2005 | Fukazawa et al. | 359/265 |
| 2011/0062981 A1* | 3/2011 | Lazaravich et al. | 326/8 |
| 2011/0180389 A1* | 7/2011 | Cremer et al. | 204/192.12 |
| 2011/0211843 A1* | 9/2011 | Tan et al. | 398/141 |

FOREIGN PATENT DOCUMENTS

| | | |
|---|---|---|
| EP | 1986350 | 10/2008 |
| EP | 2221996 | 8/2010 |

OTHER PUBLICATIONS

Zhang, J. et al., "AL/NI multilayer used as a local heat source for mounting microelectronic components", Electronic Packaging Technology & High Density Packaging, ICEPT-HDP '09, Aug. 10-13, 2009, Abstract.

* cited by examiner

*Primary Examiner* — David Payne
*Assistant Examiner* — Casey Kretzer
(74) *Attorney, Agent, or Firm* — Michael LeStrange; Andrew M. Calderon; Roberts Mlotkowski Safran & Cole, P.C.

(57) ABSTRACT

A reactive metal optical security device for implementation in an optical network and/or system to provide a mechanism for disrupting the optical network and/or system. The security device includes a mirror comprising a reactive metal stack and configured to reflect an optical signal and receive an electrical signal. The security device further includes a semiconductor chip configured to send the electrical signal to the mirror.

18 Claims, 4 Drawing Sheets

REACTIVE METAL OPTICAL SECURITY DEVICE AND METHODS OF FABRICATION AND USE

FIELD OF THE INVENTION

The invention relates to cybersecurity systems and, more particularly, to the application of reactive metals in an optical network and/or system to provide a mechanism for disrupting the optical network and/or system.

BACKGROUND

Optical networks and/or systems often comprise and transmit valuable information. The valuable information can be the target of unauthorized users. For example, an unauthorized entity may try to intercept and obtain such valuable information by intruding upon the optical networks and/or systems. In order to prevent such intrusions, the optical networks and/or systems are commonly monitored and managed for integrity to guard against intrusions and other security breaches.

Many high-speed data networks and systems transmit data on an optical backbone, but all have to convert signals into the electrical domain in order to perform required logical functions and security features. Although the latency associated with this conversion presents delays in the associated microprocessor, optical busses can sometimes mitigate bubbles appearing in the processor pipeline waiting for data being fetched in response to a request. However, in the instance of a surreptitious fetch, the path must be broken immediately to avoid a compromise of system integrity.

Accordingly, there exists a need in the art to overcome the deficiencies and limitations described hereinabove.

BRIEF SUMMARY

In a first aspect of the invention, a system is provided comprising a mirror comprising a reactive metal stack and configured to reflect an optical signal and receive an electrical signal. The system further comprises a semiconductor chip configured to send the electrical signal to the mirror.

In another aspect of the invention, a secure system is provided for an optical transmission pathway. The secure system comprises a computer system configured to generate data. The secure system further comprises an optomodulator configured to output the data. The secure system further comprises an optical bus configured to receive the output data. The secure system further comprises a first mirror positioned at a first end of the optical pathway in an optical network and/or system, the first mirror comprising a metal stack comprising a reflective metal separated from a base metal by a thin dielectric that can be electrically broken down, configured to face the optical bus. The secure system further comprises a second mirror positioned at a second end of the optical pathway in the optical network and/or system, the second mirror comprising a metal stack comprising a reflective metal separated from a base metal by a thin dielectric that can be electrically broken down that is configured to face the optical bus. The secure system further comprising a plurality of capacitors configured to store an electrical charge. The secure system further comprises a voltage impulse generator coupled to the plurality of capacitors and configured to convey the electrical charge to the first mirror upon receiving a signal indicating a security compromise of the optical network and/or system. The metal stack of the first mirror has a workfunction difference that is sufficient to sustain a chemical reaction when the dielectric separating the metals is electrically shorted, such that the reflective metal is substantially or completely consumed by the chemical reaction upon receipt of the electrical charge by the system sensing a security compromise.

In yet another aspect of the invention, a method is provided for optically breaking an optical transmission pathway. The method comprising sending an electrical charge to a mirror position within the optical transmission pathway. The method further comprising initiating a chemical reaction within the mirror via the electrical charge such that reflectivity of the mirror is substantially or completely damage. The damage to the reflectivity of the mirror breaks the optical transmission pathway.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to cybersecurity systems and, more particularly, to the use of reactive metals in an optical network and/or system to provide a mechanism for disrupting the optical network and/or system. More specifically, implementations of the invention provide a cybersecurity system comprising a reactive metal and a semiconductor chip in which the semiconductor chip is configured to initiate or trigger a chemical reaction that changes the reflectivity of the reactive metal. In embodiments, the reactive metal is formed into a mirror that is used as a waveguide in directing a signal from an optomodulator into a fiber-optic bus. The optical signal on the optical network and/or system backbone, which is commonly reflected from the optomodulator into the optic fiber, is interrupted when the mirror formed by the reactive metal incurs the chemical reaction.

Advantageously, the use of the reactive metal mirror and the semiconductor chip in optical networks and/or systems provides a mechanism for optically breaking the transmission paths upon the sensing of a tamper or security compromise of the optical networks and/or systems. In particular, the reactive metal mirror disclosed herein could be placed anywhere an optical bus is located within the optical networks and/or systems in order to provide a mechanism for optically breaking the transmission of data substantially anywhere along the optical networks and/or systems.

Figure 1:
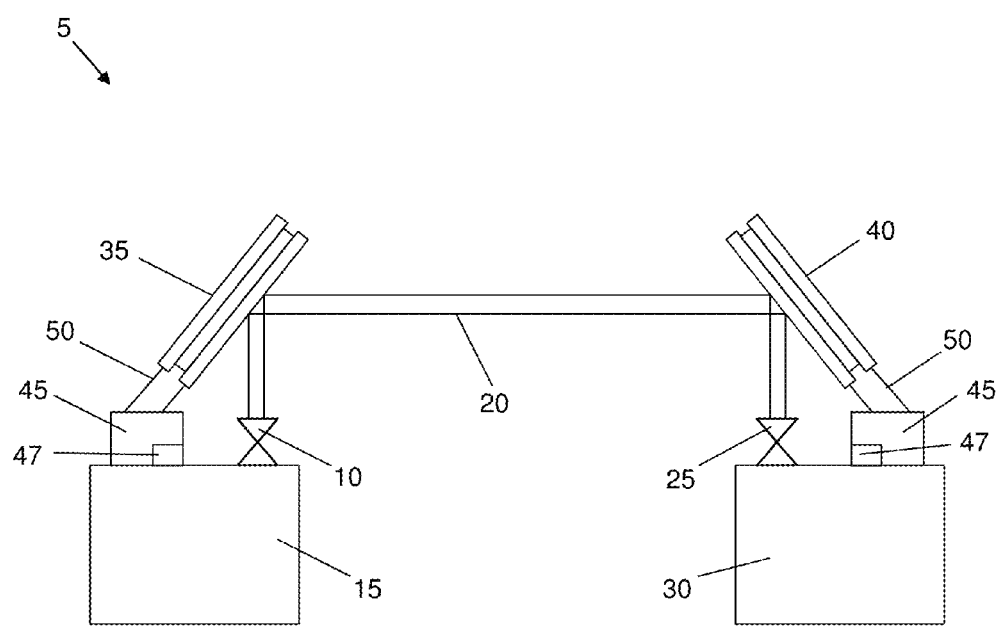
FIGS. 1 and 2 show respective structures in accordance with aspects of the present invention.

FIG. 1 shows an implementation of the cybersecurity system in an optical network and/or system 5, which provides a mechanism for permanently disabling an optical bus in an open environment if the optical bus is suspected of supporting malicious behavior, e.g., a surreptitious data fetch. Specifically, FIG. 1 shows an optomodulator 10 that is configured to report output of a first device 15, e.g., a microprocessor, into an end of an optical bus 20. For example, the optical bus 20 can be a fiber-optic bus. The output may be received by a transceiver 25 at an opposite end of the optical bus 20 and processed by a second device 30, e.g., a target logic device.

In embodiments, mirrors 35 and 40 (e.g., waveguides) are placed at opposite ends of the optical bus 20 to pass signals between the devices 15 and 30 while supporting physical structural constraints of a design of the optical network and/or system 5. More specifically, FIG. 1 shows mirrors 35 and 40 that pass signals between the first device 15 and the second device 30 via the optical bus 20. However, it should be understood by one of ordinary skill in the art that the mirrors 35 and 40 could be implemented along any path of the system. In accordance with aspects of the invention, the mirrors 35 and 40 are formed comprising a reactive metal, as discussed in further detail below.

Also shown in FIG. 1, the optical network and/or system 5 may further comprise a security monitoring circuit and a voltage impulse generator circuit 45. In embodiments, the security monitoring circuit and the voltage impulse generator circuit 45 may be combined into a single structure or multiple structures (e.g., a single semiconductor chip or multiple semiconductor chips), or may be configured as individual semiconductor chips located remotely from one another.

The security monitoring circuit is configured to detect a tampering event of the optical network and/or system 5, e.g., a surreptitious data fetch. For example, the security monitoring circuit may be configured to sense a possible intrusion of the optical network and/or system 5 using x-ray, light, heat, and/or voltage, as known in the art, and compare the sensing of the possible intrusion to a predefined threshold for the determination of a tampering event. The security monitoring circuit may be further configured to send a signal to the voltage impulse generator circuit 45 upon the determination of a tampering event occurrence.

The voltage impulse generator circuit 45 is configured to receive the signal from the security monitoring circuit upon the detection of the tampering event. In response to receipt of the signal, the voltage impulse generator circuit 45 is further configured to generate an electrical signal or charge using any source of reliable low energy. For example, the voltage impulse generator circuit 45 may be electrically coupled to an on-chip or remote capacitor 47 or plurality of capacitors 47 configured to store an electrical signal or charge. The voltage impulse generator circuit 45 may be configured to convey the electrical signal or charge from the capacitor 47 or plurality of capacitors 47 to the mirror metal stack upon receiving the signal from the security monitoring circuit.

As shown in FIG. 1, the voltage impulse generator circuit 45 is electrically coupled to the mirrors 35 and 40. For example, wire leads 50 may connect the voltage impulse generator circuit 45 to the mirrors 35 and 40. The voltage impulse generator circuit 45 is configured to send the generated electrical signal or charge via the wire leads 50 to the mirror 35 and/or 40.

In embodiments, the receipt of the electrical signal or charge at the mirrors 35 and/or 40 triggers a chemical reaction, e.g., an exothermic reaction, in the reactive metal stack of the mirror 35 and/or 40 such that metal comprising the reflective surface of the mirrors 35 and/or 40 is consumed, and the mirrors 35 and/or 40 are rendered incapable of transmitting any data via the optical bus 20. For example, the reflectivity of the mirrors may be substantially or completely destroyed by the chemical reaction such that the mirror 35 and/or 40 can no longer pass signals between the devices 15 and 30 using the optical bus 20.

As an alternative or optionally to the implementation of the security monitoring circuit, the voltage impulse generator circuit 45 may be triggered manually to generate the electrical signal or charge. For example, a user may detect or become aware of a tampering event occurrence and manually trigger the release of the electrical signal or charge via the voltage impulse generator circuit 45. Additionally, the electrical signal or charge can be generated and released directly from the capacitor 47 or plurality of capacitors 47 to initiate the chemical reaction. Advantageously, the use of the reactive metal mirror and the semiconductor chip in the optical networks and/or systems provides a mechanism for optically breaking the transmit path upon the sensing of the tamper of the optical networks and/or systems.

Figure 2:
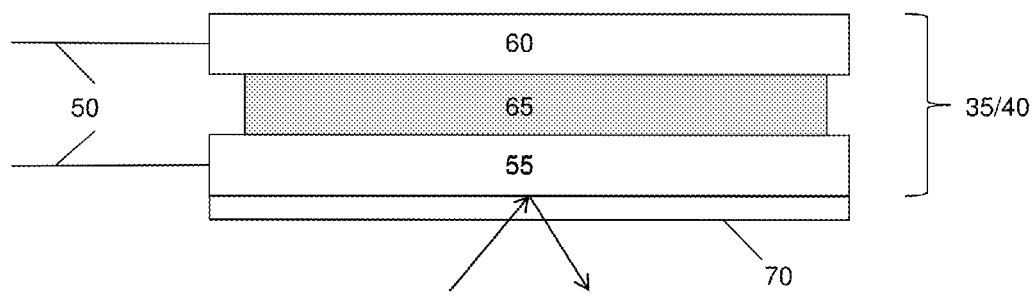

As shown in FIG. 2, the mirrors 35 and 40 comprise a reactive metal stack. In embodiments, a first metal 55 (e.g., a reactive metal layer) is formed as a reflective surface of the mirrors 35 and 40, a second metal 60 (e.g., a base metal) is formed as a back surface of the mirrors 35 and 40, and a dielectric material 65 is sandwiched between the first metal 55 and the second metal 60. The first and the second metals may be any metal or metal alloy, so long as the metal or the metal alloy selected for the first metal has a reflective property suitable for transmitting a signal via an optical bus, and a workfunction difference between the first and the second metals is sufficient to sustain a chemical reaction, e.g., an exothermic reaction, that will substantially or completely destroy the reflectivity of the first metal. In other words, the first and the second metals must comprise enough stored energy, e.g., nanojoules of energy, such that a chemical reaction may be initiated by an initial impulse signal or charge of low energy, and sustained for a long enough duration, e.g., about 200 ms, such that the first metal is consumed in such a manner that the reflectivity of the first metal is substantially or completely destroyed. For example, in embodiments, the first metal may comprise aluminum (Al) and the second metal may comprise nickel or nickel oxide ($NiO_2$).

The first metal and the second metal may be any thickness so long as they comprise enough stored energy to initiate and sustain the chemical reaction as discussed above, and the first metal layer is a small enough thickness, e.g., about 1 μm, such that the first metal layer is substantially or completely consumed in a short enough period of time, e.g., about 200 ms, to prevent the tamper of the optical networks and/or systems. Furthermore, one of ordinary skill in the art should appreciate that the mirrors 35 and 40 do not have to comprise the same materials so long as the first metal has a reflective property suitable for passing a signal via an optical bus, and the workfunction difference between the first and the second metals is sufficient to sustain a chemical reaction that will substantially or completely destroy the reflectivity of the first metal. Advantageously, the selection of the first and second metals with a nature towards consumption of the first metal in a chemical reaction provides energy for the chemical reaction without the need for an external energy source to sustain the chemical reaction.

The dielectric material 65 selected for the mirrors 35 and 40 may be any dielectric material that is capable of providing a high rate of exchange of electrons between the first metal 55 and the second metal 60 upon breakdown of the dielectric initiated by receipt of the electrical signal or charge. The exchange of electrons through the dielectric material 65 causes a momentary current to flow, e.g., an electrical field, between the first metal 55 and the second metal 60 that initiates the chemical reaction. For example, the dielectric material 65 may be an oxide-based dielectric. More specifically, the dielectric material 65 may be silicon dioxide ($SiO_2$). In any event, the dielectric material 65 should be thin, e.g., about 2 Å, in order to provide the required high rate of exchange of electrons between the first metal 55 and the second metal 60 once it is broken down by the electrical field across metal layers 55 and 60.

Also shown in FIG. 2, the mirrors 35 and 40 may further comprise a seal layer 70, which is formed over the first metal layer 55. The seal layer 70 prevents oxidation of the first metal layer 55, and should be transparent to the wavelength of light that is used for the optical signal such that the first metal is capable of receiving and reflecting the optical signal into the optical bus 20 (as shown in FIG. 1) through the seal layer 70.

Also shown in FIG. 2, the mirrors 35 and 40 are electrically connected to the leads 50. In embodiments, each lead is connected respectively to the first metal 55 and the second metal 60 in order to provide an electric field across both metals layers upon the receipt of the electrical signal or charge via the voltage impulse generator circuit 45. The leads 50 may comprise any material, e.g., copper (Cu), that is capable of transporting an electrical signal or charge sufficient to initiate the chemical reaction between the first metal 55 and the second metal 60. In accordance with aspects of the invention, the leads 50 may comprise two leads, where the first lead provides a positive voltage and the second lead provides a negative voltage.

Figure 3:
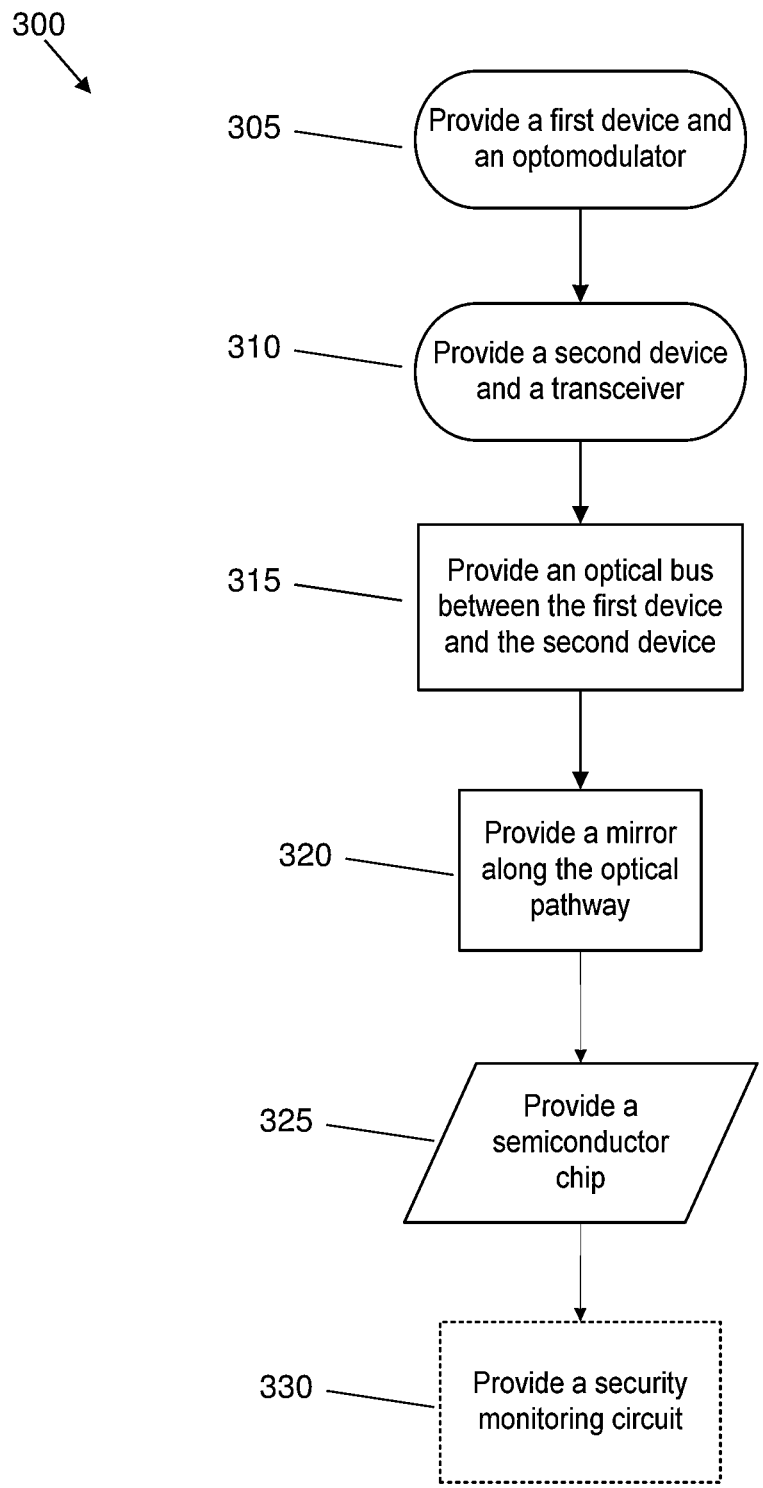
FIGS. 3 and 4 are flow diagrams of processes in accordance with aspects of the invention.
Figure 4:
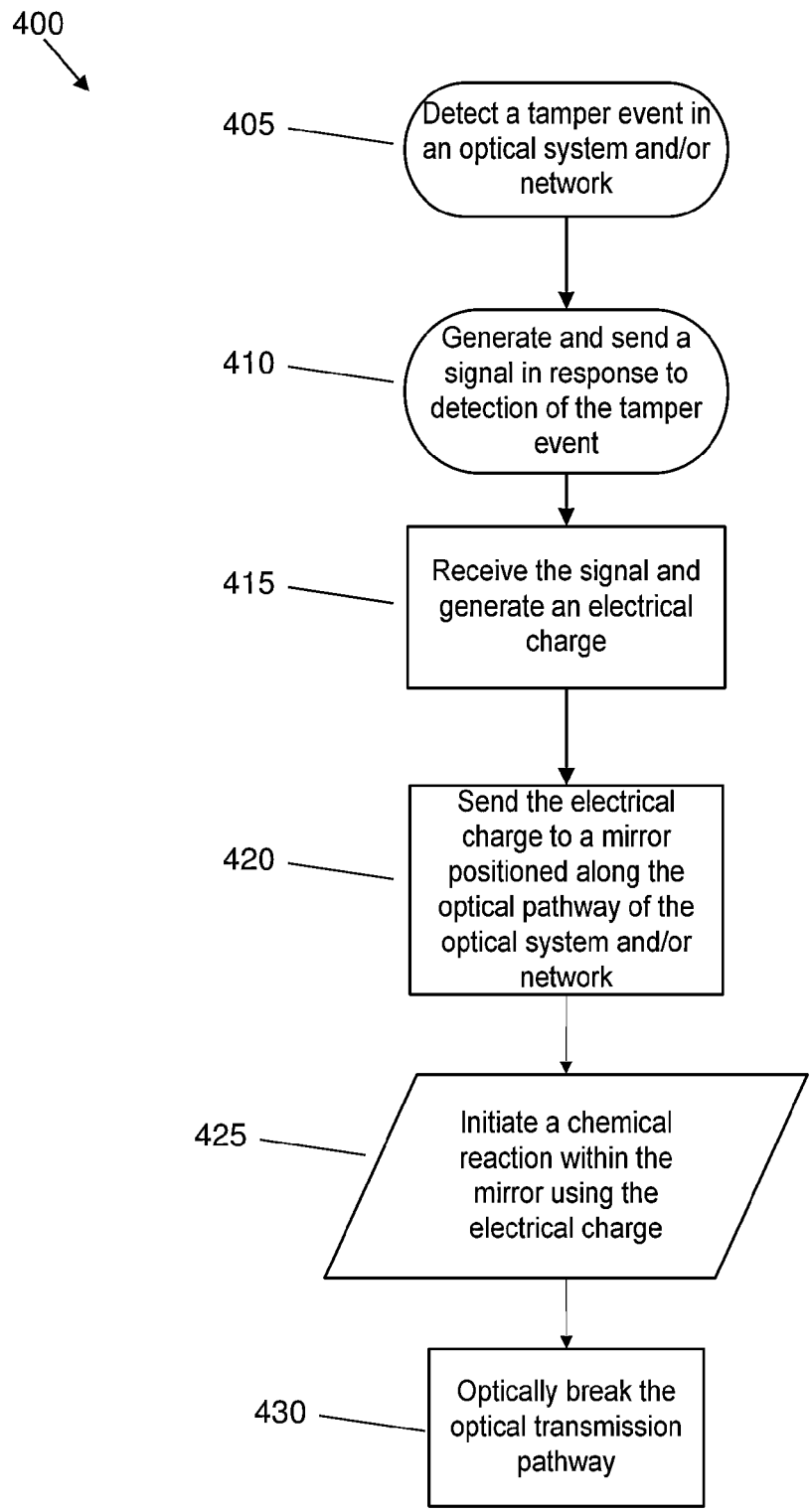

FIGS. 3 and 4 show exemplary flows for performing aspects of the present invention. The steps of FIG. 3 may be implemented to fabricate or build the optical network and/or system of 5 of FIG. 1. The steps of FIG. 4 may be implemented in the optical network and/or system 5 of FIG. 1 to optically break an optical transmission pathway. The flowcharts and block diagrams in FIG. 4 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented using a computing device in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process 300 of manufacturing an optical network and/or system in accordance with aspects of the invention. At step 305, a first device is provided with an optomodulator. The optomodulator is configured to transmit an optical signal comprising data received by the first device via an optical pathway. At step 310, a second device is provided with a transceiver. The transceiver is configured to receive the optical signal via an optical pathway and provide the data comprised within the optical signal to the second device. At step 315, an optical bus is provided between the first device and the second device such that the first device can transmit the optical signal to the second device via the optical bus. At step 320, a mirror, as discussed above with respect to FIG. 2, is placed anywhere along the optical pathway, e.g., the optical bus, such that the optical signal is reflected by the mirror and the optical signal may be interrupted by substantially or completely destroying the reflective surface of the mirror.

At step 325, a semiconductor chip is provided, which is configured to receive a signal that is indicative of a tamper event occurring within the optical network and/or system, generate an electrical signal or charge, and send the electrical charge to the mirror. Optionally, at step 330, a security monitoring circuit may be provided, which is configured to detect the tamper event occurring within the optical network and/or system and send the signal indicative of the tamper event to the semiconductor chip.

FIG. 4 depicts an exemplary flow for a process 400 of optically breaking an optical transmission pathway. At step 405, a tamper event is detected within an optical network and/or system. For example, the tamper event may be detected either manually, e.g., by a user of the optical network and/or system, or automatically, e.g., via a security monitoring circuit. At step 410, a signal is generated and sent that is indicative of the detection of the tamper event. For example, a signal may be generated by the security monitoring circuit and sent to a semiconductor chip, e.g., the voltage impulse generator circuit. Alternatively, the signal may be sent directly to the capacitor or plurality of capacitors. At step 420, the signal is received and an electrical single or charge is generated in response to the receipt of the signal. For example, the semiconductor chip may receive the signal and generate the electrical signal or charge using any source of reliable low energy. At step 425, the electrical signal or charge is sent to a mirror that is positioned anywhere along the optical pathway of the optical network and/or system. For example, the semiconductor chip may send the electrical signal or charge via leads to the mirror, which is formed as herein with respect to FIG. 2.

At step 430, a chemical reaction, e.g., an exothermic reaction, is initiated upon receipt of the electrical signal or charge by the mirror such that the metal forming the reflective surface of the mirror is consumed and the reflectivity of the mirror is substantially or completely destroyed. Advantageously, the triggering of the chemical reaction within the mirror and the subsequent consumption of the metal forming the reflective surface of the mirror causes the optical transmission path to be broken optically at step 435.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system comprising:
a mirror comprising a reactive metal stack and configured to reflect an optical signal including data and receive an electrical signal; and
semiconductor chip configured to send the electrical signal to the mirror,
wherein the semiconductor chip includes a capacitor configured to generate the electrical signal, and
the semiconductor chip further includes a voltage impulse generator coupled to the capacitor and configured to convey the electrical signal from the capacitor to the mirror upon receiving a signal indicating a security compromise of the optical network and/or system,
wherein the reactive metal stack comprises a first metal and a second metal;
the first metal has a reflective property, and a workfunction difference between the first metal and the second metal is sufficient to sustain a chemical reaction such that the reflective property of the first metal is substantially or completely destroyed; and
the receipt of the electrical signal initiates the chemical reaction to substantially or completely destroy the mirror in response to the signal indicating the security compromise.

2. The system of claim 1, wherein the reactive metal stack further comprises a dielectric material disposed between the first metal and the second metal.

3. The system of claim 2, further comprising:
a first device configured to generate data;
an optomodulator configured to output the data as the optical signal to the mirror; and
an optical bus configured to receive the optical signal from the mirror and transmit the optical signal.

4. The system of claim 3, further comprising:
another mirror comprising a reactive metal stack and configured to receive the optical signal from the optical bus and reflect the optical signal;
a transceiver configured to receive the data as the optical signal from the another mirror; and
a second device configured to process the data.

5. The system of claim 3, further comprising a security monitoring circuit configured to:
detect a tamper event of an optical network and/or system; and
send a signal to the semiconductor chip that is indicative of the tamper event,
wherein the semiconductor chip is further configured to receive the signal and generate the electrical signal in response to receipt of the signal.

6. The system of claim 2, wherein the mirror further comprises a seal layer that is formed of a transparent material, which is transparent to a wavelength of light corresponding to the optical signal.

7. A secure system for an optical transmission pathway, the system comprising:
a computer system configured to generate data;
an optomodulator configured to output the data;
an optical bus configured to receive the output data;
a first mirror positioned at a first end of the optical pathway in an optical network and/or system, the first mirror comprising a first metal stack comprising:
a first reflective metal that is configured to face the optical bus;
a first base metal; and
a first dielectric configured to be electrically broken down, wherein the first dielectric separates the first reflective metal from the first base metal;
a second mirror positioned at a second end of the optical pathway in the optical network and/or system, the second mirror comprising a second metal stack comprising:
a second reflective metal that is configured to face the optical bus;
a second base metal; and
a second dielectric configured to be electrically broken down, wherein the second dielectric separates the second reflective metal from the second base metal;
a plurality of capacitors configured to store an electrical charge; and
a voltage impulse generator coupled to the plurality of capacitors and configured to convey the electrical charge to the first mirror upon receiving a signal indicating a security compromise of the optical network and/or system,
wherein the first metal stack of the first mirror has a workfunction difference that is sufficient to sustain a chemical reaction when the first dielectric is electrically broken down such that the first reflective metal is substantially or completely consumed by the chemical reaction upon receipt of the electrical charge when the system senses the security compromise.

8. The system of claim 7, wherein the first reflective metal and the second reflective metal are a same metal, and the first base metal and the second base metal are the same metal.

9. The system of claim 8, wherein the first reflective metal is aluminum and the first base metal is nickel.

10. The system of claim 9, wherein the first reflective metal and the second reflective metal are about 1 μm in thickness.

11. The system of claim 10, wherein the first and the second dielectric are an oxide-based dielectric.

12. The system of claim 10, wherein the first mirror and the second mirror further comprise a seal layer that is formed of a transparent material, which is transparent to a wavelength of light corresponding to an optical signal for transmitting the output data.

13. The system of claim 7, further comprising:
another plurality of capacitors configured to store an electrical charge; and
another voltage impulse generator coupled to the another plurality of capacitors and configured to convey an electrical charge to the second mirror upon receiving the signal indicating the security compromise of the optical network and/or system,
wherein the second metal stack of the second mirror has a workfunction difference that is sufficient to sustain a chemical reaction when the second dielectric is electrically broken down such that the second reflective metal is substantially or completely consumed by the chemical reaction upon receipt of the electrical charge when the system senses the security compromise.

14. A method for optically breaking an optical transmission pathway, the method comprising:
sending an electrical charge to a mirror positioned within the optical transmission pathway, the mirror comprising a reactive metal stack and being configured to reflect an optical signal including data sent along the optical transmission pathway; and
initiating a chemical reaction within the mirror via the electrical charge such that reflectivity of the mirror is substantially or completely damaged,
wherein the damage to the reflectivity of the mirror breaks the optical transmission pathway,
further comprising storing the electric charge in a capacitor; and
conveying the electric charge from the capacitor to the mirror via an impulse generator upon receiving a signal indicating a security compromise of the optical transmission pathway, wherein the reactive metal stack comprises a first metal and a second metal;

the first metal has a reflective property, and a workfunction difference between the first metal and the second metal is sufficient to sustain the chemical reaction such that the reflective property of the first metal is substantially or completely destroyed; and the receipt of the electrical charge initiates the chemical reaction to substantially or completely destroy the mirror in response to the signal indicating the security compromise.

15. The method of claim 14, further comprising:

detecting the security compromise of an optical network and/or system comprising the optical transmission pathway; and sending a signal indicative of the security compromise, wherein the electrical charge is sent in response to the signal.

16. The method of claim 15, further comprising:

receiving the signal; and generating the electrical charge using a source of reliable low energy.

17. The method claim 14, wherein the mirror comprises a reactive metal stack.

18. The method of claim 17, wherein the reactive metal stack of the mirror has a workfunction difference that is sufficient to sustain a chemical reaction that substantially or completely damages the reflectivity of the mirror.

* * * * *